UNITED STATES PATENT OFFICE.

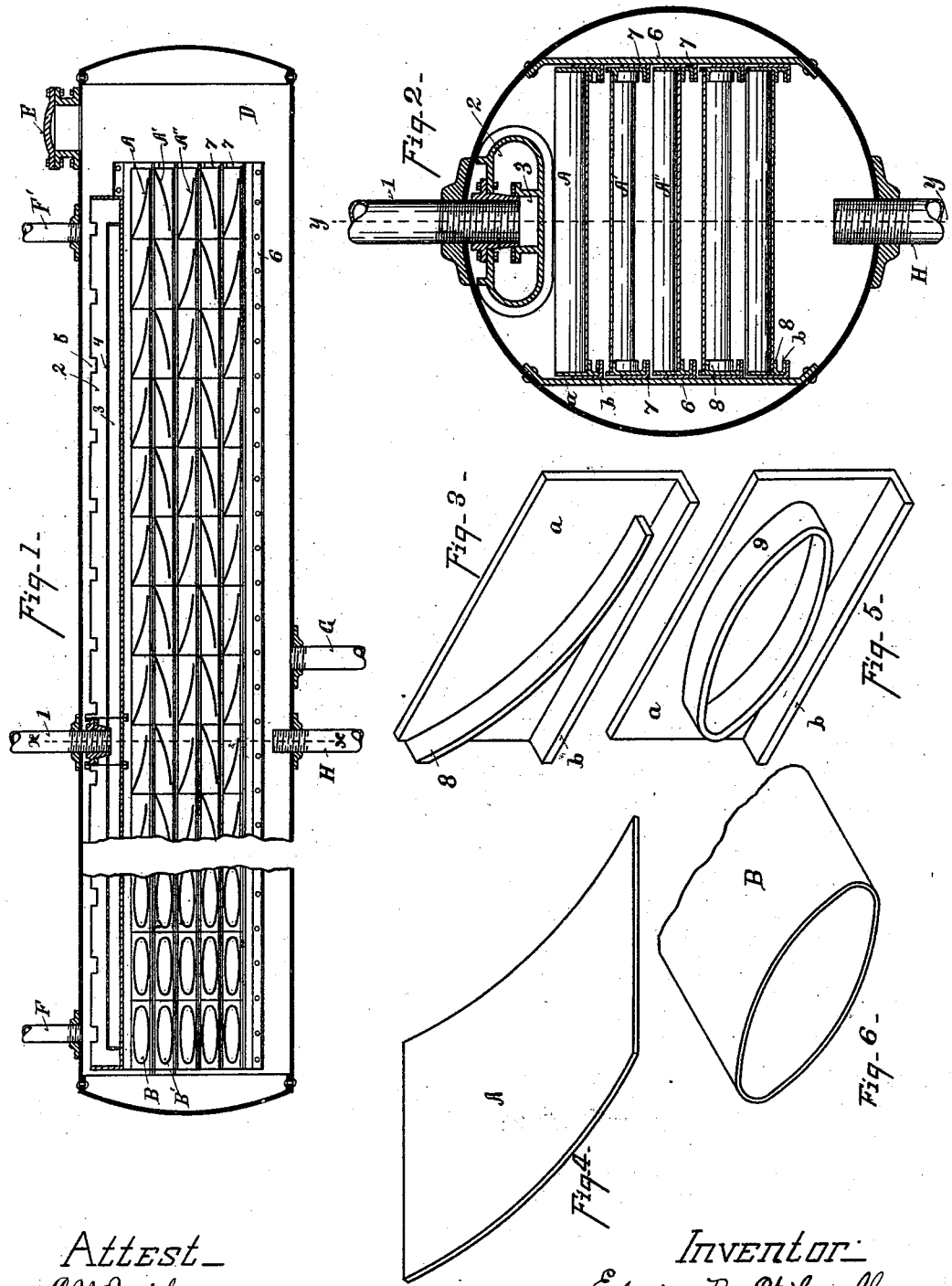

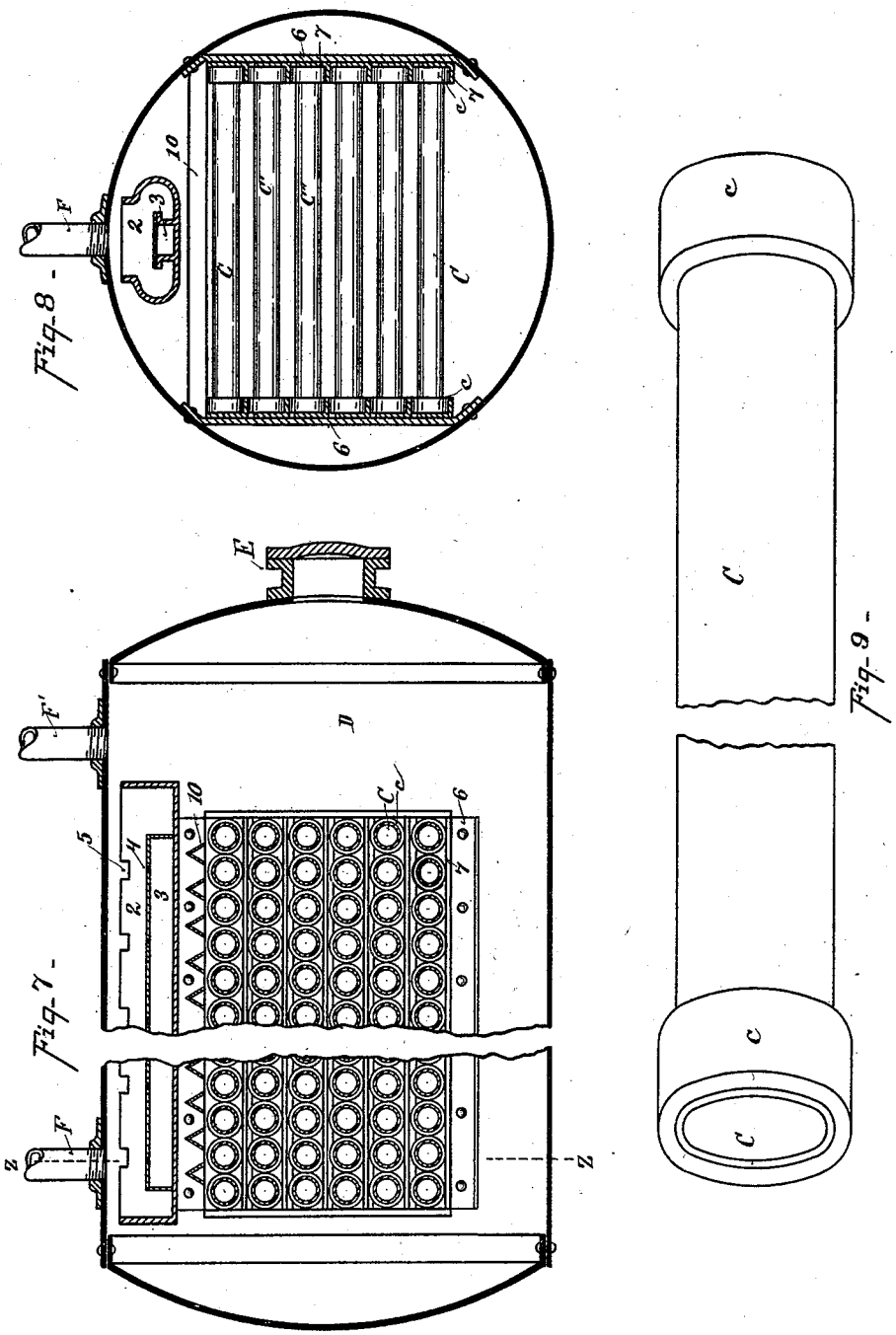

EDWIN R. STILWELL, OF DAYTON, OHIO, ASSIGNOR TO THE STILWELL-BIERCE & SMITH-VAILE MANUFACTURING COMPANY, OF SAME PLACE.

PURIFIER.

SPECIFICATION forming part of Letters Patent No. 510,301, dated December 5, 1893.

Application filed May 23, 1892. Serial No. 434,113. (No model.)

*To all whom it may concern:*

Be it known that I, EDWIN R. STILWELL, a citizen of the United States, residing at Dayton, in the county of Montgomery and State of Ohio, have invented certain new and useful Improvement in Purifiers, of which the following is a specification.

My invention relates to that class of purifiers which removes the impurities from water by either exhaust or live steam. I have shown the invention as adapted to a live steam purifier as the preferred form of use; it may, however, be used as an exhaust heater.

The object of my invention is to provide an improved method of constructing and arranging the interior of the heater so that a very large amount of depositing surface is obtained, thereby rendering the purifier more effective. The construction of the devices for catching lime and other impurities in the water is such that they can be readily taken out and cleaned and put in, which is a material feature in purifiers, as they have to be cleaned in some cases as often as once a week, and hence a convenient method of removing the inside works of the purifier is a very important feature of construction.

The various features of my invention are fully set forth in the description of the accompanying drawings making a part of this specification, in which—

Figure 1 is a central vertical longitudinal view of my improvement partly in section, on line y, y, Fig. 2. Fig. 2 is a section on line x, x, Fig. 1. Fig. 3 is a detail view of one of the brackets. Fig. 4 is a detail view of a pan. Fig. 5 is a modification of Fig. 3, and Fig. 6 is a modification of Fig. 4. Fig. 7 is a modification of Fig. 1. Fig. 8 is a section on line z, z, Fig. 7. Fig. 9 is a detail view of one of the depositing tubes.

1 represents the water supply pipe.

2 represents an overflow box into which the feed water is admitted; it is provided with a secondary trough or pipe 3, into which the feed water pipe depends; this trough is closed but provided with apertures 4 at intervals along the box through which the water passes up into the main trough 2; these apertures are shown under the overflow notches 5, a series of which is arranged the entire length of the box, one overflow being vertically over each tier of shelves, or lime catchers.

I have shown three forms of shelves or lime catching devices; these devices are supported as follows: 6 represents stanchions bolted to the sides of the heater, and upon these stanchions are riveted a series of ways 7 preferably formed of angle irons which form brackets to support the shelves or lime catching devices. I have shown five tiers of these lime catchers.

A represents one form of shelf or lime catcher; they are supported at either end upon the inclined cleats 8 of the brackets a.

b represents a ledge forming the bottom of the bracket which rests and slides on the ways 7. A' is a second pan of this tier supported upon a similar bracket but set in the reverse position so that the water which runs from the shelf A will drop on to shelf A', and from thence on to shelves A'', and so on down the tier on to the bottom of the purifier.

B represents a cylindrical or elliptical form of shelf or lime catcher. The bracket a in this case is provided with an elliptical collar 9, on which the elliptical shelf B engages, there being a bracket at each end of this shelf B while the brackets rest upon the ways 7.

In Figs. 7 and 9 I have shown another form; being a complete cylinder. This cylinder C is provided with collars c on each end, which rest upon the ways 7; this form allows the lime catchers C to be rolled along upon the angle iron brackets; they can, therefore, be easily taken in and out of the purifier, and this is the preferred form of construction. In order to insure the water dropping on to the top of the cylinders I provide a series of saddles 10 arranged over and midway between the series of catching cylinders. It is ordinarily customary to use the shelves or catching devices running longitudinally along the purifier, and with the form here shown a series of lime catchers may be made to run across the purifier and they can be readily taken out; a space D being left between the end tier and the head, and the man hole E being provided opposite this space. In Fig. 1 I have shown this man hole on the top of the heater, and in Fig. 7 I have shown it in the end of the head. It has been customary in live steam purifiers to make the head of cast iron and removable so as to remove the shelves or lime catching devices; cast heads are objectionable, but by employing a man hole and having the pans or lime catching devices in short sections no matter how long the purifier is they can be readily removed through the man hole and the heads can be made of boiler iron, and are much stronger and better than cast iron. The space D allows the operator to enter through the manhole and remove the catchers and pass them out of the man hole readily. In like manner the operator can enter through the manhole and build up the tiers commencing at the farther end. This is a very important feature as these purifiers have to be frequently cleaned. It is desirable also, to have a large amount of surface on the lime catching devices, and to pass the water over in a very thin stream or drops, as the lime, magnesia, and other similar impurities set free by the heat are more readily deposited and separated from the water when in broken streams or in drops, than from a large body; and hence, the cylinders are elliptical in form, furnishing more surface with a given area of heater than other forms, and yet allow the water to pass over in thin sheets or drops.

Another advantage is derived from the use of the cylindrical form of lime catching devices; they can be cleaned with less liability of bending or warping than the shelf form; the cylindrical structure being solid will stand pounding or scraping to remove the deposits.

In the use of live steam purifiers two steam supply pipes are required, one at each end. F F' represent these live steam supply and circulating pipes. G represents a blow off pipe. H represents the hot water supply pipe leading to the boiler.

Having described my invention, what I claim is—

1. In combination with the live steam purifier, having a series of tiers of lime catching devices, the overflow box provided with the secondary trough 3, the supply pipe 1 extending into said trough 3, and a series of supply orifices in the cover of said trough vertically over each tier of lime catchers, substantially as specified.

2. In a horizontal purifier, a compound series of short lime catching devices attached to and supported upon brackets, a series of ways 7 attached to stanchions 6, and a space D at one end of the heater, substantially as herein specified.

3. In a horizontal purifier, a compound series of lime catching devices supported upon brackets attached to each end of the lime catchers, and a series of horizontal ways 7 on which said brackets rest and slide, whereby the said lime catchers and supporting brackets are readily introduced and removed from the heater, substantially as specified.

4. In combination with a heater, a series of cylindrical lime catchers arranged in tiers one above the other, separately removable from said purifier, substantially as specified.

5. In combination with a heater, the series of cylindrical lime catchers supported upon brackets and adapted to be serially introduced and removed therefrom, and the saddles 10 spanning the space between the two upper cylinders of each tier and directing the water centrally upon the cylinder, substantially as specified.

In testimony whereof I have hereunto set my hand.

EDWIN R. STILWELL.

Witnesses:
   JAS. R. RANDALL,
   BENJAMIN F. MCCANN.